US007827696B2

(12) United States Patent
Settele

(10) Patent No.: US 7,827,696 B2
(45) Date of Patent: Nov. 9, 2010

(54) CORN SCRAPER

(75) Inventor: Ignaz Settele, Kaufbeuren (DE)

(73) Assignee: Maxpat Trading & Marketing (Far East) Limited, Hong Kong (HK)

( * ) Notice: Subject to any disclaimer, the term of this patent is extended or adjusted under 35 U.S.C. 154(b) by 1018 days.

(21) Appl. No.: 11/436,738

(22) Filed: May 18, 2006

(65) Prior Publication Data
US 2006/0288582 A1 Dec. 28, 2006

(30) Foreign Application Priority Data
Jun. 24, 2005 (EP) ................................. 05253924

(51) Int. Cl.
 *A47J 17/02* (2006.01)
(52) U.S. Cl. .......................... 30/121.5; 30/169; D7/693
(58) Field of Classification Search ................... 30/169, 30/115, 116, 113.3, 123.5, 121.5, 304, 298; D7/393, 680–696; 99/584, 588, 542–545, 99/567, 568, 600, 537, 623, 485; 460/38, 460/48, 49, 53
See application file for complete search history.

(56) References Cited

U.S. PATENT DOCUMENTS

| 99,522 | A | * | 2/1870 | Gilroy ........................ 52/483.1 |
| 287,080 | A | * | 10/1883 | Anderson .................. 30/121.5 |
| 644,732 | A | * | 3/1900 | Crandall ....................... 30/149 |
| 702,419 | A | * | 6/1902 | Giovanna ................... 30/123.5 |
| 961,825 | A | * | 6/1910 | Wells ......................... 30/121.5 |
| 1,024,240 | A | * | 4/1912 | Wood ........................... 99/567 |
| 1,345,456 | A | | 7/1920 | Olcott |
| 1,633,365 | A | | 6/1927 | Ebmeier |
| 1,971,222 | A | | 8/1934 | Hunter ........................... 146/4 |
| 2,010,414 | A | * | 8/1935 | Rekonty .................... 30/123.5 |
| 2,040,458 | A | | 5/1936 | Bacon |
| 2,173,751 | A | | 9/1939 | Burkhart ......................... 146/4 |
| 2,251,842 | A | | 8/1941 | Hill |
| 2,285,567 | A | * | 6/1942 | Carroll ....................... 30/121.5 |
| 2,322,503 | A | | 6/1943 | Bowman ...................... 30/148 |
| 2,415,114 | A | | 2/1947 | Skolrud ........................... 146/4 |
| 2,493,588 | A | * | 1/1950 | Gustave ...................... 30/121.5 |
| 2,863,478 | A | * | 12/1958 | Drybread, Sr. .............. 30/121.5 |
| 3,176,390 | A | | 4/1965 | Robinson |
| 3,674,035 | A | * | 7/1972 | Edmiston ................... 30/121.5 |
| 4,885,842 | A | | 12/1989 | Marley ....................... 30/121.5 |

(Continued)

OTHER PUBLICATIONS

European Search Report dated Dec. 9, 2005 in corresponding European Application No. 05253924.4.
English language translation of an Office Action dated May 8, 2009 in corresponding Chinese Application No. 200610082773.4.

*Primary Examiner*—Ghassem Alie
(74) *Attorney, Agent, or Firm*—Ostrolenk Faber LLP

(57) ABSTRACT

A corn scraper for removing whole kernels from the core of a corn includes a handle portion and a utility portion connected to the handle portion. The utility portion includes a bridge member and a base plate. The bridge member is connected to the base plate against which an ear of corn is put in use. The bridge member is provided with at least one tooth means for engagement and cutting into the root of the kernels of the corn.

2 Claims, 5 Drawing Sheets

U.S. PATENT DOCUMENTS

| | | | |
|---|---|---|---|
| 4,892,034 A * | 1/1990 | Miles | 99/567 |
| D353,976 S | 1/1995 | Perkins | |
| 5,438,760 A | 8/1995 | Charlier | 30/304 |
| D364,015 S | 11/1995 | Stoltzfus | |
| D526,544 S | 8/2006 | Settele | |
| D600,513 S * | 9/2009 | Vlahos | D7/693 |

* cited by examiner

CORN SCRAPER

FIELD OF THE INVENTION

The present invention relates to a corn scraper for removing kernels from the core of a corn.

BACKGROUND OF THE INVENTION

There are commercial corn scrapers for removing kernels from the core of a corn. Typically, these corn scrapers are relatively large and heavy duty and they are able to remove most if not all kernels from the core in one punching step. These scrapers normally have a cylinder-like cutter with a sharp circular cutting blade or edge at the lower end. In preparing fresh kernels for cooking in a household environment, however, kernels are often removed from the core by simply using a typical kitchen knife which is often not satisfactory. For example, the knife may be too sharp and it may undesirably remove part of the core from the corn. Or it may undesirably cut the kernels into pieces because of the curvature of the corn. In any event, the use of a kitchen knife for removing kernels is unsatisfactory.

The present invention seeks to provide a corn scraper which overcomes these drawbacks or at least provides an alternative to the public.

SUMMARY OF THE INVENTION

According to a first aspect of the present invention, there is provided a corn scraper for removing whole kernels from the core of a corn comprising a handle portion at one end and a utility portion connected to said handle portion at the other end, wherein said utility portion includes a bridge member connected to a base plate adjacent or against which an ear of corn is put in use, and wherein said bridge member is provided with at least one tooth means for engagement and cutting into the root of the kernels of the corn.

Preferably, the bridge member may comprise opposite end portions connected by an intermediate portion, and wherein the tooth means may extend from the intermediate portion.

Suitably, the bridge member and the base plate together may define a channel through which removed kernels are passed.

According to a second aspect of the present invention, there is provided a corn scraper for removing whole kernels from the core of a corn comprising a handle portion at one end and a utility portion connected to the handle portion at the other end, wherein the utility portion includes a bridge member provided with opposite end portions connected to a base plate thereof, and wherein the bridge member and the base plate together define a channel through which removed kernels are passed. The scraper may be relatively light and compact suitable to be held and used with a single hand in a domestic kitchen. The base may serve as a platform on which the corn may lean in use.

Preferably, the bridge member may further comprise an intermediate portion connecting the end portions, and wherein the bridge member may be provided with at least one tooth means at the intermediate portion for engagement and cutting into the root of the kernels of the corn.

Suitably, the opposite end portions may extend from the base plate substantially perpendicularly.

Advantageously, the bridge member may be fixedly attached to the base plate. The bridge member may be welded to the base to prevent accidental detachment thereof.

Preferably, the base plate may be slightly curved in shape generally conforming to the curvature of an ear of a corn whereby the corn is put adjacent or against the base plate in use. In particular, the region of the base plate below or closest to the intermediate portion of the bridge member may be recessed for facilitating disengagement of the kernels from the core in use.

Suitably, the tooth means may point to the handle portion to travel in a direction along the longitudinal axis of the handle in use.

The distance or the vertical distance between the intermediate portion of the bridge member and the base plate may be slightly greater than the height of a typical kernel. In particular, the channel may be sized and shaped to accommodate the passage of at least two kernels arranged side by side at a time.

Advantageously, the tooth means may comprise two teeth adapted to cut into and remove two rows of whole kernels from the core in one scraping motion. The removal of two kernels (or two rows of kernels) at a time enhances the removal efficiency as compared to removing only one kernel (or one row of kernels) at a time. The use of two teeth may be advantageous over the use of a laterally extending or relatively long blade or cutting edge which would reach the root of the kernels closely packed on the corn with difficulty.

The channel through which the kernels pass may have a height from substantially 9 to 11 mm and/or a width from substantially 10 to 15.5 mm. This height is roughly slightly greater than the typical height of a kernel. This width is roughly about twice the typical width of a kernel.

BRIEF DESCRIPTION OF THE DRAWINGS

An embodiment of the present invention is now described, by way of example only, with reference to the following drawings in which.

DESCRIPTION OF THE PREFERRED EMBODIMENT

Figure 1:
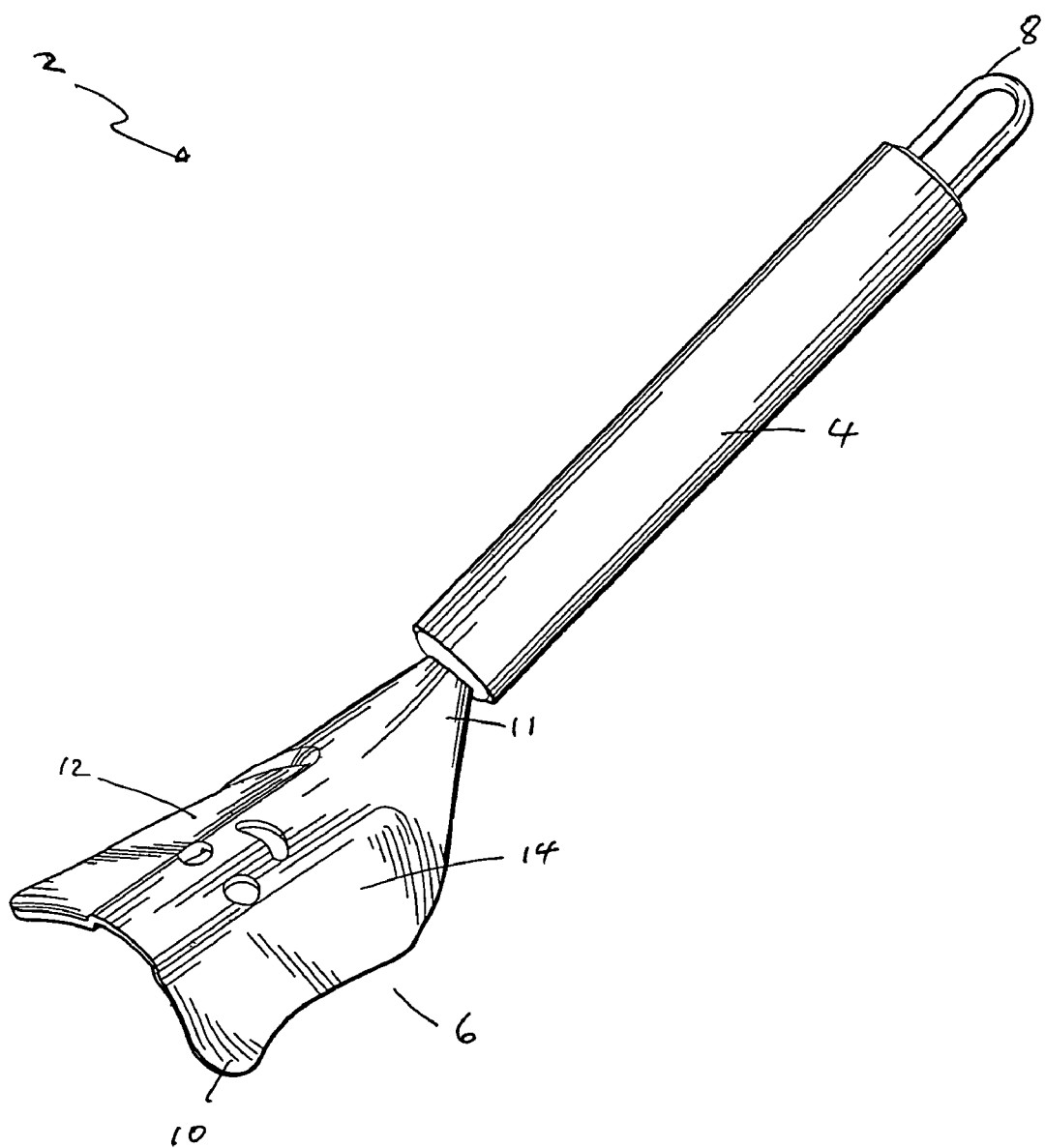
FIG. 1 is a top perspective view of a corn scraper in accordance with an embodiment of the present invention.
Figure 2:
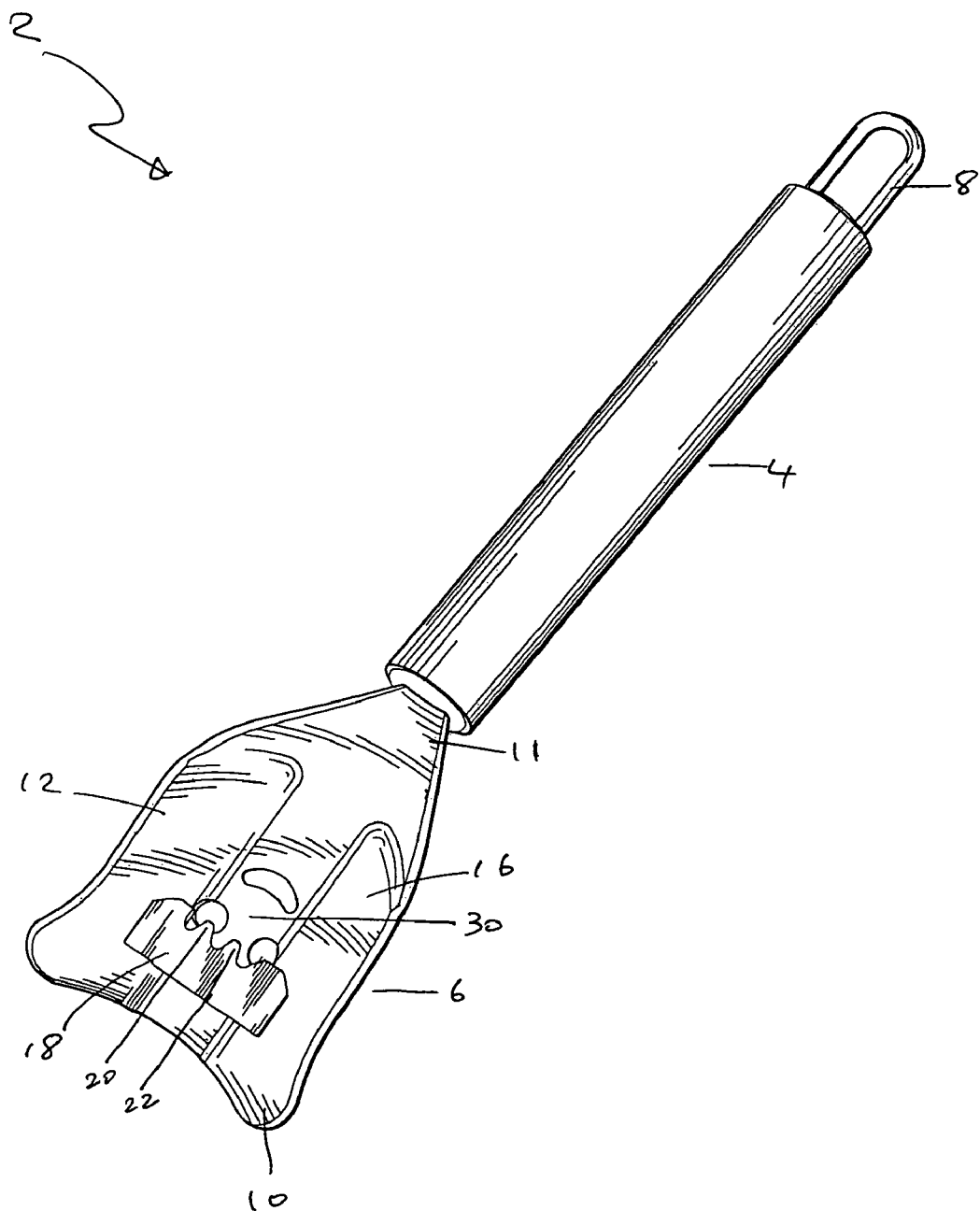
FIG. 2 is a bottom perspective view of the corn scraper shown in FIG. 1.
Figure 3:
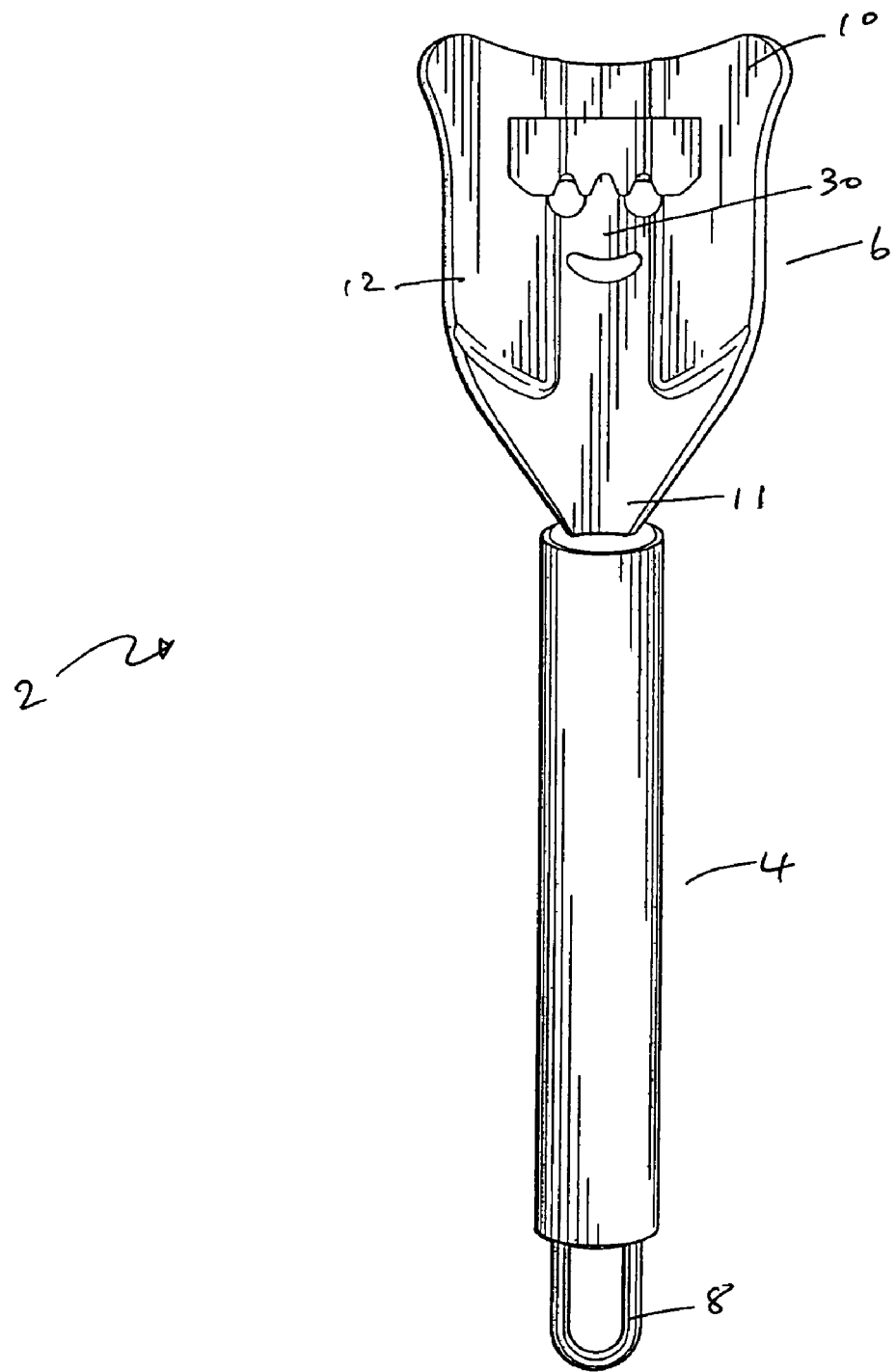
FIG. 3 is a bottom view of the corn scraper shown in FIG. 1.

Turning to the drawings, as can be seen in FIGS. 1 to 5, there is provided a handheld corn scraper generally indicated 2 having an elongate handle 4 and a utility portion 6. The handle 4 is provided with a hook 8 at the rear end 11 and the utility portion 6 has wider front end 10 and a narrower rear end 11 fixedly connected to the handle 4.

The utility portion 6 comprises a base plate or a base 12 having an upper surface 14 and a lower surface 16. The base 12 is slightly curved as clearly shown in FIGS. 1, 4, 7 and 8. The curvature of the base 12 generally conforms to the curvature of a typical ear of corn in the market. While the specific radius of curvature of the base 12 varies at different locations of the base 12, it typically ranges from about 25 mm to 28.5 mm which is the typical radius of corns in the market.

Figure 4:
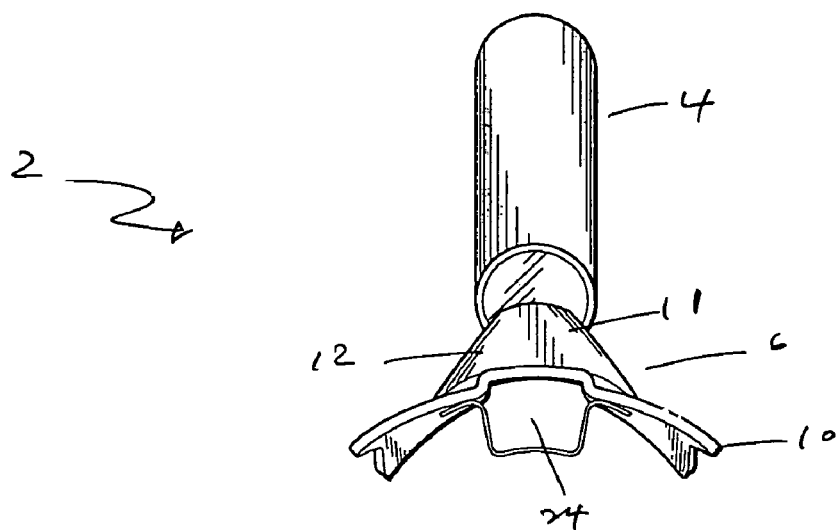
FIG. 4 is a front view of the corn scraper shown in FIG. 1.
Figure 5:
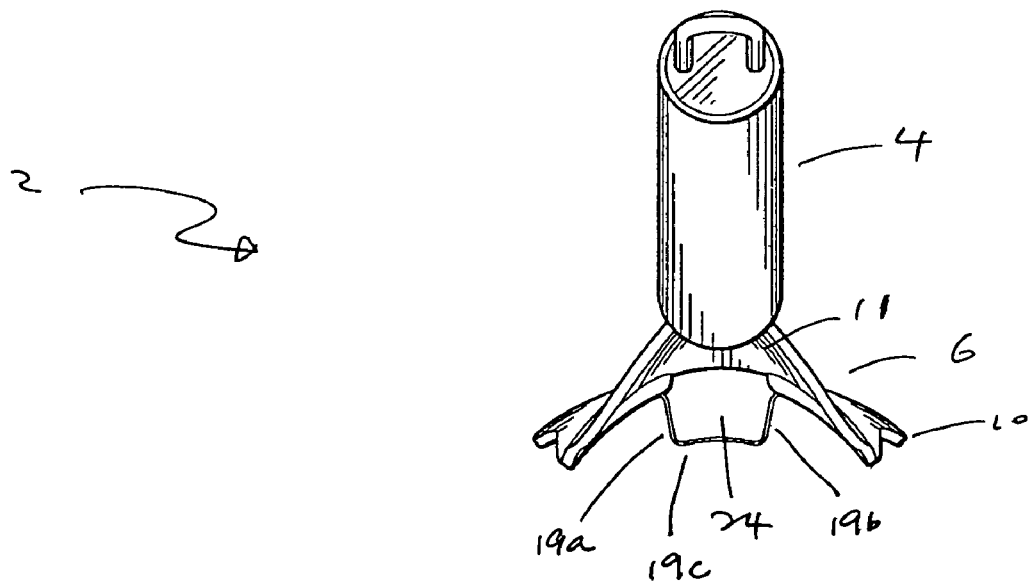
FIG. 5 is a rear view of the corn scraper shown in FIG. 1.
Figure 6:
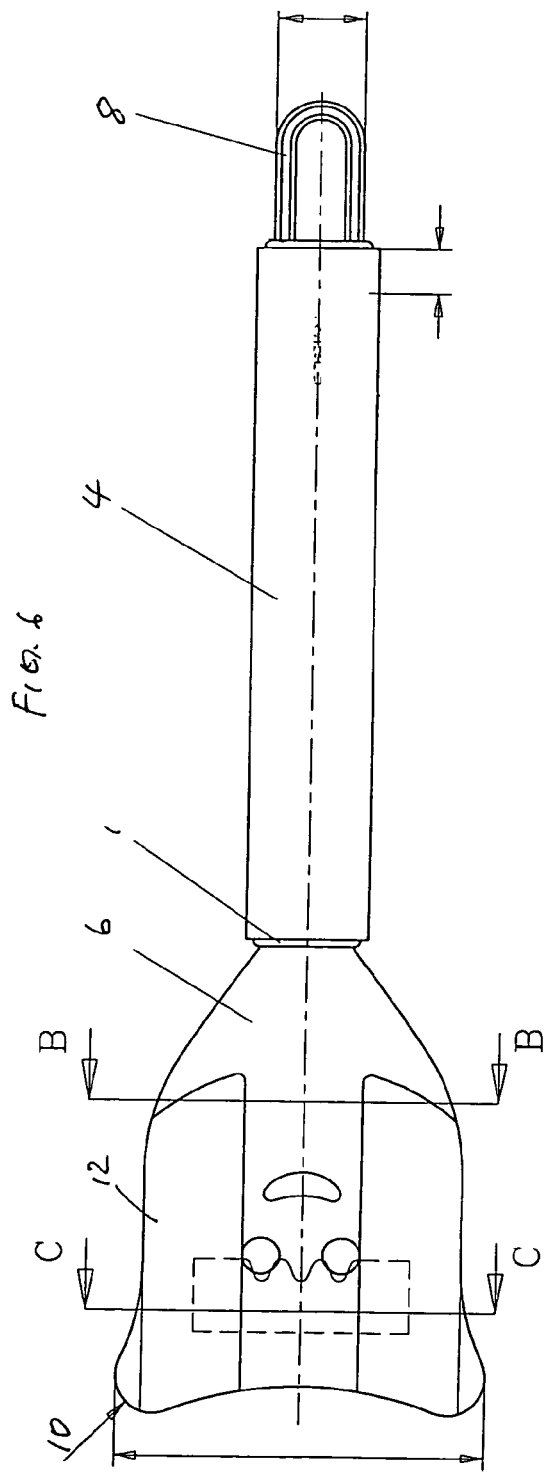
FIG. 6 is a schematic view taken from the bottom of the corn scraper of FIG. 1.
Figure 8:
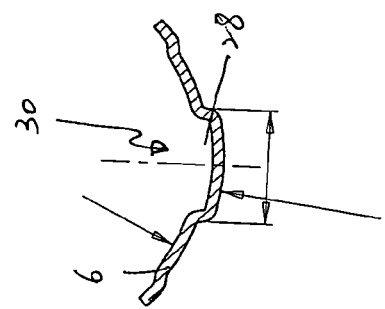
FIG. 8 is a cross section view taken at B-B in FIG. 6.
Figure 7:
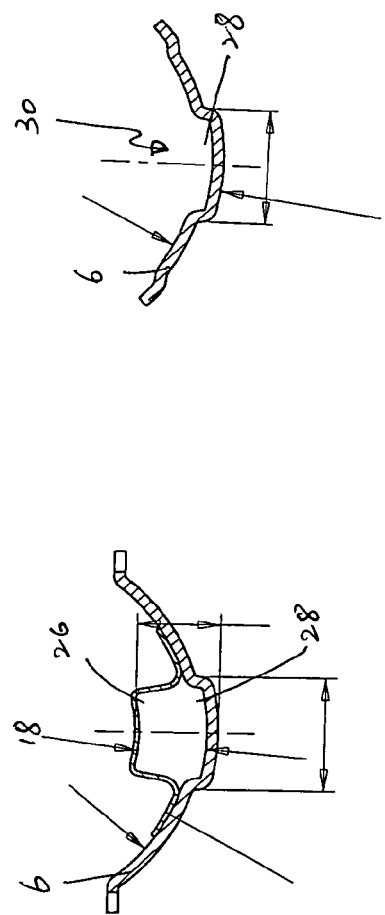
FIG. 7 is a cross section view taken at C-C in FIG. 6.

As shown in FIGS. 2 to 5 and 7, the utility portion 6 is provided with a bridge member 18 welded at the lower front end of the scraper 2 at the base 12. The bridge member is relatively thin and comprises opposite end regions 19a, 19b connected together by an intermediate region 19c. The opposite end regions 19a, 19b extend perpendicularly from and are welded to the base 12. In particular, the bridge member 18 is provided with two teeth 20, 22, each having a sharp edge or a pointed region at the intemediate region. Each of the teeth is relatively thin and has a width which is about the same or comparable to the width of a typical kernel for facilitating the cutting into the root of a kernel. The sharp edge of the teeth 20, 22 points to the handle 4. It is shown in FIGS. 4, 5 and 7 that a channel 24 is defined between the bridge member 18 and the base 12 (see FIGS. 4 & 5). The channel 24 has a narrower upper region 26 and a wider lower region 28 (see FIG. 7). The width of the channel 24 roughly corresponds to the width of two typical kernels arranged side by side. In particular, the lower region 28 has a width of about 15.5 mm. The base 12 has a recessed region 30 in its middle portion and the recessed region 30 extends from a front end 10 towards a rear end 11 of the base 12 (see FIGS. 7 & 8). This region 30 is recessed when viewed from the bottom side of the scraper 2 (see FIGS. 2 & 3, 7 & 8). The bridge member 18 overlies part of the recessed region 30. The vertical distance between the upper region 26 of the channel 24 (or the bridge member 18) and the recessed region 30 of the base 12 is roughly slightly greater than the height of a typical kernel, and in this particular embodiment it is about 11 mm.

The scraper 2 is generally made of stainless steel although any durable material may be used.

From the figures, it is shown that while the scraper 2 is elongate in shape the longitudinal axis of the handle 4 is offset from the longitudinal axis of the utility portion 6 such that in use fingers holding onto the gripping portion of the handle 4 do not interfere with the scraping of the corn. In use, a user holds the scraper 2 at the handle 4 in one hand and places it on an ear of a corn held by the other hand such that the region of the lower surface 16 of the base 12 between the bridge member 18 and the handle 4 contacts and presses against the top end of the corn. In particular, the teeth 20, 22 are aligned in a way such that the sharp edge of the teeth 20, 22 touches the root of two adjacent kernels at the top of the corn. As the base 12 is being held against the corn and the scraper 2 is being moved downwardly in relation to the corn, the teeth 20, 22 cut into the root of the two top kernels and the whole kernels are removed from the core of the corn. As the scraper 2 is further downwardly moved and slides towards the other end and along the length of the corn, it is envisaged that two rows of whole kernels are cut and removed from the core through the channel 24 in one scraping motion. The recessed region 30 facilitates the removal and disengagement of the whole kernels from the core and the passing of the kernels through the channel 24 in use. While this embodiment is designed such that two row of whole kernels can be removed from the core at a time, it is envisaged that with the use of a different size and/or shape of a bridge member, one row or more than two rows of kernels may be removed. It is to be noted that unlike some corn scrapers in the market, a corn scraper according to the present invention does not require resting on a table or countertop surface to perform its function.

The invention claimed is:

1. A scraper for removing whole kernels from an ear of corn, the scraper comprising:
   a curved plate having a plate axis, the curvature of the plate varying at locations spaced apart in the direction of the plate axis and generally conforming to the curvature of an ear of corn, the curved plate tapering from a wide front end toward a narrower rear end;
   a concave side on the curved plate;
   a recessed region centrally disposed in the concave side and elongated in the direction of the plate axis, the recessed region being formed such that in a transverse section through the curved plate the recessed region is recessed inwardly of concave faces of identical radius of curvature disposed on opposing sides of the recessed region;
   a handle with a longitudinal end fixed directly to the rear end of the curved plate and extending rearward for being gripped rearwardly of the curved plate, and
   a bridge member spanning across the recessed region, the bridge member comprising sheet material relatively thinner than the curved plate, the bridge member comprising opposite end regions connected together by an intermediate region, the opposite end regions being mounted proximate the front end of the curved plate, each of the opposite end regions extending substantially perpendicularly away from the curved plate, the intermediate region having opposing leading and trailing edges aligned transverse to the longitudinal axis, with teeth formed on the leading edge pointing toward the handle, the teeth being configured for cutting into the root of a kernel, the bridge member and recessed region cooperating to define a channel for receiving cut kernels, the channel having a narrower part adjacent the intermediate region and a wider part adjacent the recessed region.

2. The scraper of claim 1, wherein the narrower part and wider part of the channel are respectively bounded internally by a convex face of the intermediate region and by a concave face of the recessed region.

* * * * *